Feb. 9, 1960

H. A. ELLERY 2,924,426

MECHANICAL JACKING DEVICE

Filed Aug. 30, 1954

2 Sheets-Sheet 1

Inventor
H. A. Ellery

By:
Hancock Downing & Seebay
Attorneys

Feb. 9, 1960  H. A. ELLERY  2,924,426
MECHANICAL JACKING DEVICE
Filed Aug. 30, 1954  2 Sheets-Sheet 2

Inventor
H. A. Ellery

By:
Glascock Downing Seebold
Attorneys

United States Patent Office 2,924,426
Patented Feb. 9, 1960

2,924,426

MECHANICAL JACKING DEVICE

Henry A. Ellery, Oamaru, New Zealand

Application August 30, 1954, Serial No. 452,873

Claims priority, application New Zealand
September 8, 1953

1 Claim. (Cl. 254—86)

This invention relates to mechanical jacking devices used for raising or moving weights or loads that are too heavy to be conveniently raised or moved by hand.

One object of the present invention is to provide an improved jacking device of the aforesaid kind which is of strong and relatively simple construction, and can be easily and safely operated.

A further object of the invention is to provide a jacking device of the aforesaid kind which is suitable for attachment to the draw bars of towed vehicles, and which, in its attached position, is operable to raise the draw bar and to support the draw bar in a raised position to facilitate the coupling or uncoupling of the draw bar to or from a towing vehicle.

According to the invention, the improved mechanical jacking device consists of a brace member formed with teeth separated by gaps; a load-supporting bracket slidably mounted on the brace member; a jacking lever pivotally connected at one end to the bracket and having pivot means thereon adjacent to such end and adapted to engage in a desired one or more of the gaps between the teeth of the brace member and to provide a fulcrum around which the lever can be moved so as to move the bracket closer to the fulcrum; and locking means whereby the bracket can be held in a desired position against movement in the reverse direction on the brace member.

The bracket may be adapted for attachment to the draw bar of a towed vehicle, and means may be provided for retaining the brace member when desired, in an inoperative and travelling position relative to the bracket when the latter is so attached.

Figure 1:
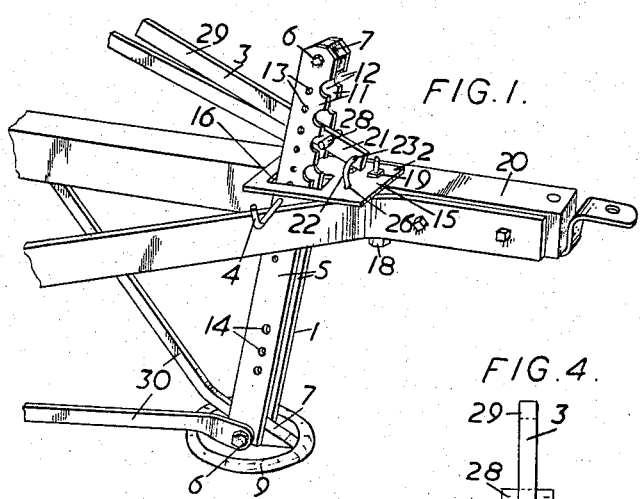
Figure 2:
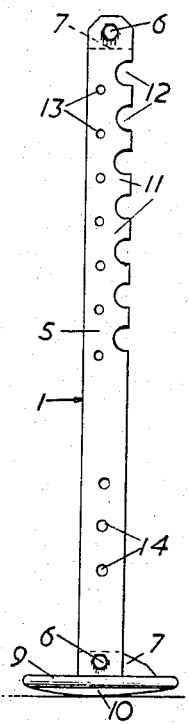
Figure 3:
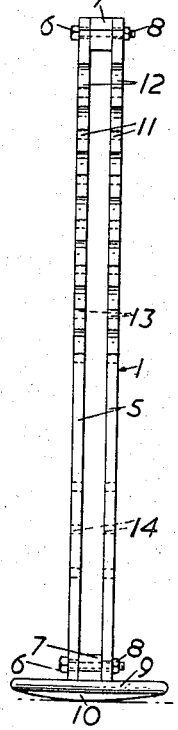
Figure 4:
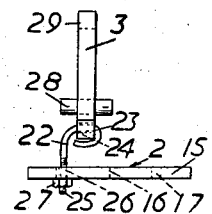
Figure 5:
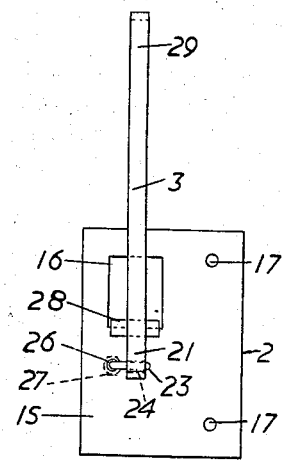
Figure 6:
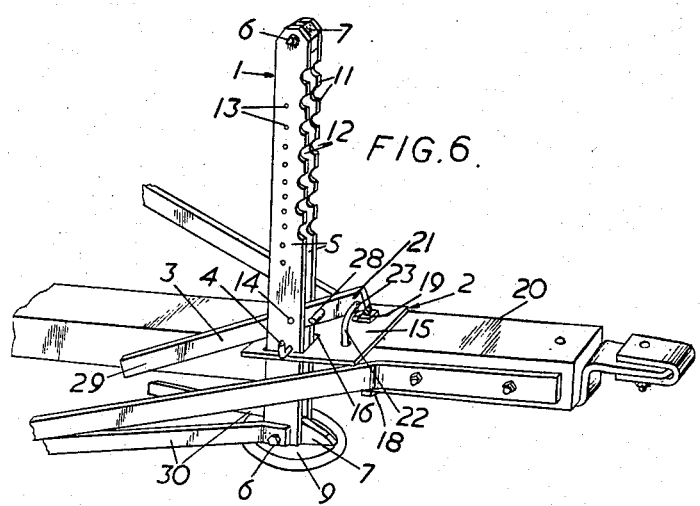
Figure 7:
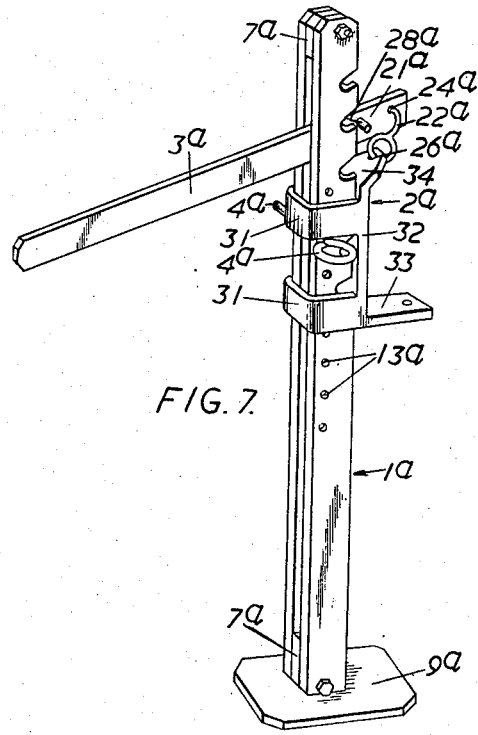

Two forms of the invention will now be described, with reference to the accompanying drawings, in which:

Figure 1 is a perspective view of one form of the device mounted on the draw bar of a towed vehicle, and showing the device in an operative position, Figure 2 is a side elevation of the brace member of the device shown in Figure 1, Figure 3 is a front elevation of Figure 2, Figure 4 is a front elevation of the bracket and lever of the device shown in Figure 1, Figure 5 is a plan of Figure 4, Figure 6 is a perspective view of the device mounted as shown in Figure 1, but showing the device in an inoperative or travelling position, and Figure 7 is a perspective view of an alternative form of the device.

In the form of the device shown in Figures 1 to 6 inclusive, the device is mounted on the draw bar of a towed vehicle, and consists of a normally upright brace member 1, a load supporting bracket 2, a jacking lever 3, and a locking pin 4.

The brace member 1, consists of a pair of rectangular metal side plates 5 secured together in an upright position in spaced side-by-side relationship by means of bolts 6 passing through the side plates 5 and through intermediate spacer blocks 7 at the upper and lower end portions of the plates 5, and receiving nuts 8 which are tightened on the bolts 6. The lower spacer block 7 is formed as a moulded lug on the upper surface of a foot 9 of the brace member 1, which foot 9 is formed with a convex lower surface 10 for a purpose to be hereinafter stated. The foot 9 is thus pivotally secured between the lower end portions of the side plates 5. The side plates 5 are formed at their upper portions and along one longitudinal edge with a series of teeth 11 separated by gaps 12, and are formed with a corresponding series of registering pairs of holes 13, extending transversely through the brace member 1. At their lower portions the side plates 5 are also formed with a relatively short series of registering pairs of vertically spaced holes 14 between the longitudinal edges of the plates 5.

The load-supporting bracket 2 is in the form of a rectangular metal bracket plate 15 having a rectangular opening 16 offset towards one corner of the bracket plate 15, and sufficiently large to pass over the brace members 1 and enable the bracket 2 to be slidably mounted on the brace member 1, as shown in Figure 1. The bracket plate 15 is formed with a pair of holes 17 through which pass bolts 18, receiving nuts 19, whereby the bracket 2 is secured to the draw bar 20 of a towed vehicle (not shown). In the drawings, one of the bolts 18 is shown in Figure 1, while the other is obscured by the brace member 1.

The jacking lever 3 passes between the side plates 5 of the brace member 1, and is pivotally and loosely connected at its inner end portion 21 to the bracket 2, by means of a link 22 which has a looped upper portion 23 passing through a hole 24 in the inner end portion 21 of the lever 3, and has a screw threaded lower end portion 25 passing loosely through a hole 26 in the bracket plate 15 of the bracket 2, and receiving a holding nut 27.

At its inner end portion 21, the lever 3 is provided with a fixed pivot pin 28 passing transversely through the lever 3 and projecting on either side thereof. The pivot pin 28 is engageable in a desired registering pair of the gaps 12 in the side plates 5 of the brace member 1, by corresponding movement of the lever 3, and when so engaged forms a fulcrum around which the lever 3 can be turned by means of pressure applied to its outer end portion 29, so as to raise the bracket 2 and the attached draw bar 20 in relation to the brace member 1.

When the bracket 2 has been thus raised as far as possible in one movement of the lever 3, it is held in its raised position relative to the brace member 1, by the locking pin 4, which is inserted through a registering pair of the holes 13 in the side plates 5 of the brace member 1 and immediately below the bracket plate 15. A hole or slot (not shown) is formed in the draw bar 20 to accommodate the inner end of the locking pin 4.

To raise the bracket 2 and draw bar 20 further in relation to the brace member 1, the lever 3 is moved to disengage the pivot pin 28 from the aforesaid pair of gaps 12 and to engage the pivot pin 28 in the next above pair of gaps 12, the levering operation being then repeated to raise the bracket 2 and draw bar 20 a stage higher on the brace member 1. The locking pin 4 is then removed and replaced through the next above pair of holes 13 to hold the bracket 2 in its raised position. The bracket 2 and draw bar 20 can thus be raised by stages to the desired height above the ground at which the draw bar 20 can most conveniently be coupled to a towing vehicle (not shown).

When the draw bar 20 has been coupled to the towing vehicle, the locking pin 4 is withdrawn and the brace member 1 is raised through the opening 16 in the bracket 2 to a travelling position at a convenient height above the ground, as shown in Figure 6. The locking pin 4 is then inserted through a registering pair of the holes 14 in the lower portions of the side plates 15 of the brace member 1 and immediately above the bracket plate 15 of the bracket 2, so as to hold the brace member 1 in its raised position relative to the bracket 2.

When it is desired to uncouple the draw bar 20 from the towing vehicle, the locking pin 4 is removed from the holes 14 and the brace member 1 is lowered through the opening 16 in the bracket 2 until the foot 9 of the brace member 1 rests on the ground. The locking pin 4 is then inserted through a registering pair of the holes 13 immediately below the bracket plate 15 in a position to support the load on the bracket 2 and draw bar 20 when the latter is uncoupled from the towing vehicle.

When the draw bar 20 has been so uncoupled, the convex lower surface 10 of the foot 9 of the brace member 1 acts as a skid on which the draw bar 20 can be swung or otherwise moved to a desired position of the towed vehicle.

When the device is attached to the draw bar of a towed vehicle, as shown in Figures 1 and 6, the lower end portion of the brace member 1 is braced from the towed vehicle by a pair of brace bars 30 which are pivotally secured at one end to the lower end portions of the side plates 15 on either side of the brace member 1 by means of the lower one of the bolts 6. The other ends (not shown) of the brace bars 30 are pivotally secured in any suitable usual way to fixed points on the body or chassis of the towed vehicle.

In the alternative form of the device shown in Figure 7, the device is adapted for use as an ordinary mechanical jack. To save confusion, parts of the alternative form of the device which correspond to parts of the first-described form of the device will be referred to by the same reference numerals with the addition of the letter a.

In the alternative form of the device, the brace member 1a is of similar construction to the brace member 1 of the first described form of the device, save that the foot 9a of the brace member 1a is formed of a metal plate having a flat lower surface (not visible in the drawings).

The load supporting bracket 2a consists of a pair of vertically spaced rectangular sleeves 31 formed on an upright plate 32 having at its lower end a right-angled load-carrying extension 33. The upper end of the plate 32 is formed with an outwardly turned lug 34 pierced by a hole 26a in which is engaged a chain shaped link 22a. The link 22a is also engaged in a hole 24a in the inner end portion 21a of the lever 3a, which lever is of similar construction to the lever 3 of the first described form of the invention.

To hold the bracket 2a in a desired position on the brace member 1a, the locking pin 4a can be inserted through a registering pair of the holes 13a immediately beneath either one of the sleeves 31 of the bracket 2a, but is shown in Figure 7 inserted through a pair of holes 13a immediately beneath the upper one of the sleeves 31.

When the alternative form of the device is in use, the extension 33 of the bracket 2a is placed in position below the load to be lifted, and the device is operated in the same manner as the first described form of the device to raise the load or to hold the load in a raised position. Lowering of the load is effected by reversing the operation of raising the load.

The invention is not limited to the above-described forms of the improved device, which are described by way of example only, but includes all other forms lying within the scope of the appended claim.

What I do claim and desire to obtain by Letters Patent of the United States of America is:

A mechanical jacking device for use with a draw bar of a towed vehicle, comprising a brace member provided with teeth separated by gaps, a load supporting bracket defined by a rectangular flat plate having an opening therein offset towards one corner of the plate and being of such dimensions as to receive the brace member whereby the bracket is slidably mounted on the brace member, further means cooperable with the flat plate adjacent the edge thereof opposite the said opening to secure the bracket to the draw bar whereby the opening is located laterally of the draw bar, a jacking lever, means directly pivotally connecting one end of the lever to the flat plate between the opening and the edge of the plate, with such pivotal connection being on the same side as the teeth of the brace member, pivot means on the jacking lever between the pivotally connected end and the teeth of the brace member adapted to engage selectively in a desired gap between the teeth of the brace member to define a fulcrum about which the jacking lever can be swung to move the bracket closer to the fulcrum, and locking means cooperable with the brace member and the bracket operative to hold the bracket in its adjusted position against reverse movement on the brace member.

References Cited in the file of this patent

UNITED STATES PATENTS

| | | |
|---|---|---|
| 373,528 | Judd | Nov. 22, 1887 |
| 449,308 | Brown | Mar. 31, 1891 |
| 802,588 | Parks et al. | Oct. 24, 1905 |
| 1,342,057 | Miller | June 1, 1920 |
| 1,663,131 | Johnston | Mar. 20, 1928 |
| 2,153,722 | Loughmiller | Apr. 11, 1939 |
| 2,196,510 | Vutz | Apr. 9, 1940 |
| 2,245,935 | Neighbour et al. | June 17, 1941 |
| 2,570,334 | Erjavec | Oct. 9, 1951 |
| 2,715,029 | Compton | Aug. 9, 1955 |